Aug. 7, 1934.  R. E. NEWELL  1,969,574

THERMOSTAT BELLOWS ASSEMBLY

Filed Nov. 17, 1931

INVENTOR

Robert E. Newell
by Byrnes, Stebbins, Parmelee & Alusha
His Attys.

Patented Aug. 7, 1934

1,969,574

UNITED STATES PATENT OFFICE

1,969,574

THERMOSTAT BELLOWS ASSEMBLY

Robert E. Newell, Irwin, Pa., assignor to Robertshaw Thermostat Company, Youngwood, Pa., a corporation of Pennsylvania Application November 17, 1931, Serial No. 575,547

5 Claims. (Cl. 297—8)

This invention relates generally to thermostats, and more particularly to a thermostat bellows assembly for opening and closing a valve in order to control the supply of fuel to a heater.

In the accompanying drawing, which illustrates the present preferred embodiment of my invention, Figure 1 is a vertical central section through the bellows assembly, also showing the means for connecting the assembly to a valve casing;

Figure 1:
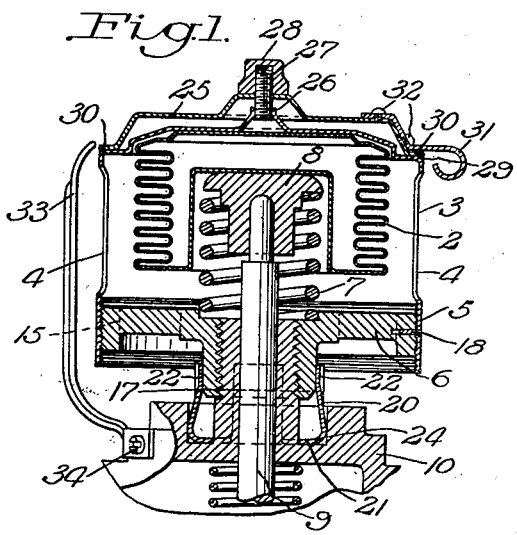

A thermostat bellows assembly should be sensitive, preferably to a 1° change in room temperature. It should be rugged and capable of being manufactured at a low cost. Thermostat bellows assemblies of the present type are generally installed on or near the space heater or gas-fired radiator with which it is used, the installation being made near the floor line. In this position, it is likely to be banged by chair legs or accidentally stepped on, and it is, therefore, necessary that it be of a very rugged construction. It is generally sold as an accessory to low-priced heating appliances, and for this reason its manufacturing cost must be kept as low as possible. All of these requirements are met by the present invention.

Referring more particularly to the accompanying drawing, a bellows 2 is mounted within a cage 3. The cage is made of drawn sheet steel and is provided with air vents 4. The cage is open at its lower end and is threaded, as indicated by the reference numeral 5, for receiving a retaining member 6 which retains a spring 7 and the bellows within the cage.

As the bellows expands or contracts, it moves a spring rest 8 in which is received a rod 9. The rod 9 extends down into a valve casing 10 and is connected by means (not shown) to a valve which regulates the supply of gas flowing through the valve casing. The construction and operation of the valve is not shown as it forms no part of the present invention, except as it is necessary to describe its operation in connection with the bellows assembly. The construction and operation of the valve is illustrated and described in my application Serial No. 470,784, filed July 26, 1930.

Figure 4:
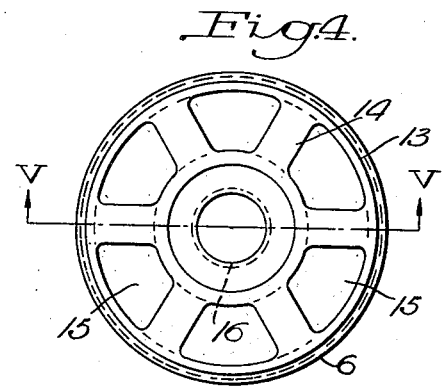
Figure 4 is a plan view of a retaining member for retaining the bellows in the cage.
Figure 2:
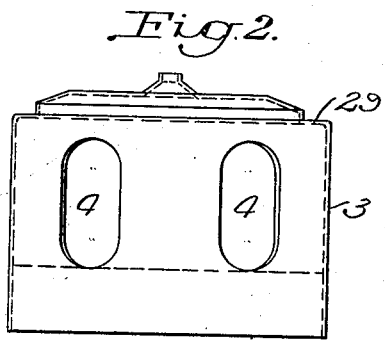
Figure 2 is a side elevation of a cage for protecting the bellows.
Figure 5:
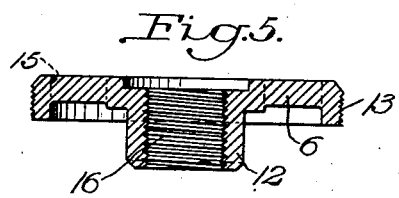
Figure 5 is a vertical section taken in a plane corresponding to the line V—V of Figure 4.

The retaining member 6 which retains the spring 7 and the bellows 2 within the cage is shown in detail in Figures 4 and 5. It is a one-piece casting having a hub 12 and a rim 13 connected by spokes so as to provide vent openings 15 between the spokes. The outer edge of the rim is threaded so that it can be adjustably threaded into the lower end of the casing 3. The hub 12 is threaded internally, as indicated by the reference numeral 16, so that it can be adjustably threaded onto a boss 17 projecting from the valve casing 10, as shown in Figure 1. The retaining member 6 is secured in adjusted position within the cage by a pin 18 fitting in corresponding openings in the cage and retaining member. Adjustment of the retaining member 6 in the cage increases the compression of the spring 7 and tends to contract the bellows. The action of the spring 7 is overcome by expansion of the air within the bellows when the temperature rises.

The whole bellows assembly including the bellows 2, cage 3 and retaining member 6 may be adjusted toward or away from the valve casing by threading the retaining member which has been locked in fixed position to the cage 3 by the pin 18, up or down on the boss 17. This movement raises or lowers the rod 9 so as to regulate the opening and closing of the valve.

Figure 6:
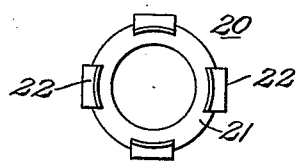
Figure 6 is a plan view, and Figure 7 a side elevation, of a friction brake for holding the bellows assembly in adjusted position on the valve casing.
Figure 7:
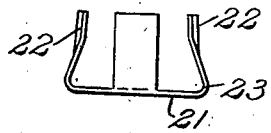

In order to hold the bellows assembly in adjusted position relative to the valve casing 10, a friction brake 20 is provided. The brake is shown in detail in Figures 6 and 7 and comprises a ring 21 having prongs 22 extending upwardly from the ring. The friction brake is made of resilient material and the prongs are spaced apart a less distance than the outer diameter of the hub 12 on the retaining member 6. The lower portion 23 of the friction brake fits in a recess 24 provided in the valve casing, while the upper ends of the prongs contact with the outer surface of the hub 12. The friction brake prevents the bellows assembly from being jarred out of adjusted position by vibration.

Figure 3:
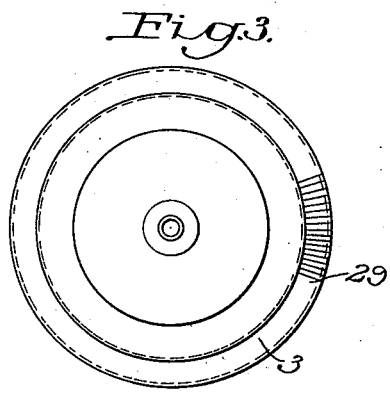
Figure 3 is a plan view of the cage.

A dial 25 is supported by the top of the cage 3. The upper central portion of the cage is provided with a boss 26 which is threaded to receive a screw 27. The dial is retained on the cage by a nut 28 threaded onto the screw 27. The ledge 29 of the cage is knurled, as indicated in Figure 3, and the flange 30 of the dial is correspondingly knurled to engage with the knurls on the ledge 29. In adjusting the thermostat for a certain temperature, the dial and cage are rotated as a unit, and this knurled construction insures that the dial will not move relative to the cage.

Figure 8:
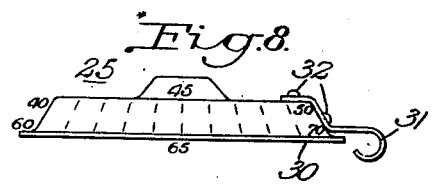
Figure 8 is a side elevation of the dial which is mounted on the cage.

A dial stop clip 31 is secured to the dial by screws 32 and is so arranged that its rotation is limited by the upper end of a resilient pointer 33 secured, as indicated by the reference numeral 34, to the valve casing. The dial may be provided with two scales, one from 40° to 60° and the other from 60° to 80°, as indicated in Figure 8. When the pointer 33 is in the position indicated in Figure 1, the rotation of the dial is limited to one of these temperature ranges, say, from 40 to 60°. However, if it is desired to operate within the 60°–80° range, the pointer may be sprung out of its position, since it is made of a flexible material, in order to allow the dial stop clip to pass by the pointer. The clip may then be rotated within the 60°–80° range. These ranges which are given only by way of illustration, may be changed, and more than two scales may be indicated on the dial.

The use of a one-piece retaining member 6 simplifies the construction and reduces the manufacturing cost. Both the retaining member and the cage are vented in order to allow the air to flow up through the vents in the retaining member and out through the vents in the cage. Where the bottom of the cage is enclosed by a solid retaining member, circulation of the air is decreased, thereby decreasing the sensitiveness of the bellows assembly.

I have illustrated and described the present preferred embodiment of my invention. It is to be understood, however, that the invention may be otherwise embodied within the scope of the following claims.

I claim:

1. A thermostat bellows assembly for attachment to a valve casing, comprising a bellows, a vented cage surrounding the bellows, a spring within the cage and supporting the bellows, said cage being internally threaded to receive a spring retaining member, and a spring retaining member threaded in said cage, said spring retaining member being internally threaded for connection with the valve casing.

2. A thermostat bellows assembly, comprising a bellows, a spring for supporting the bellows in the cage, a one-piece drawn steel vented cage protecting the bellows, said cage being threaded at its lower open end for receiving a spring retaining member, and a one-piece vented cast retaining member adjustably threaded in said cage for retaining said spring and bellows in position.

3. In a thermostat bellows assembly having an adjustable rotatable connection with a support, a dial having a plurality of temperature scales thereon, a dial stop clip secured to the dial, a pointer secured to the support and extending in the path of rotation of said dial stop clip to limit the movement of the dial to one temperature scale, the pointer being resilient so that it can be sprung out of position in order to allow movement of said dial stop clip past the pointer, whereby the adjustment of the thermostat may be increased to indicate temperatures in another temperature range.

4. A thermostat for air temperature control comprising a vented cage having an open end permitting the insertion of a bellows therein, a bellows positioned within said vented cage, a loading spring arranged to support said bellows, an adjustable freely removable closure member fitting the open end of said cage, said closure member being formed to guide and support said loading spring.

5. A thermostat for air temperature control comprising a vented cage having an open end permitting the insertion of a bellows therein, a bellows positioned within said vented cage, a loading spring arranged to support said bellows, an adjustable freely removable closure member fitting the open end of said cage, said closure member being formed to guide and support said loading spring and having a smooth friction surface, and a friction brake having a plurality of oppositely placed friction leaves adapted to contact said friction surface for holding the bellows in adjusted position.

ROBERT E. NEWELL.